(12) United States Patent
Stelzer et al.

(10) Patent No.: US 9,957,870 B2
(45) Date of Patent: May 1, 2018

(54) EXHAUST-GAS MIXER

(71) Applicant: TENNECO GMBH, Edenkoben (DE)

(72) Inventors: Bertram Stelzer, Neustadt (DE);
Joachim Gehrlein, Rheinzabern (DE);
Andreas Lang, Hassloch (DE);
Michael Wolf, Herxheim (DE);
Christoph Burg, Steinweiler (DE)

(73) Assignee: TENNECO GMBH, Edenkoben (DE)

( * ) Notice: Subject to any disclaimer, the term of this patent is extended or adjusted under 35 U.S.C. 154(b) by 0 days. days.

(21) Appl. No.: 15/315,051

(22) PCT Filed: May 12, 2015

(86) PCT No.: PCT/EP2015/060482
§ 371 (c)(1),
(2) Date: Nov. 30, 2016

(87) PCT Pub. No.: WO2015/188999
PCT Pub. Date: Dec. 17, 2015

(65) Prior Publication Data
US 2017/0114693 A1    Apr. 27, 2017

(30) Foreign Application Priority Data

Jun. 10, 2014 (DE) .................. 10 2014 108 127
Jun. 24, 2014 (DE) .................. 10 2014 108 809

(51) Int. Cl.
*F01N 3/10* (2006.01)
*F01N 3/28* (2006.01)
(Continued)

(52) U.S. Cl.
CPC ....... *F01N 3/2892* (2013.01); *B01D 46/0027* (2013.01); *B01D 53/9418* (2013.01);
(Continued)

(58) Field of Classification Search
CPC ...... F01N 3/2066; F01N 3/021; F01N 3/2892; F01N 2610/1453; B01D 53/9418; B01F 5/0062
(Continued)

(56) References Cited

U.S. PATENT DOCUMENTS

| 4,538,413 A | 9/1985 | Shinzawa et al. |
| 5,105,621 A | 4/1992 | Simmons et al. |

(Continued)

FOREIGN PATENT DOCUMENTS

| DE | 20 2007 010 324 U1 | 1/2009 |
| DE | 10 2008 043408 A1 | 5/2010 |

(Continued)

*Primary Examiner* — Tom P Duong
(74) *Attorney, Agent, or Firm* — Hudak, Shunk & Farine Co. LPA

(57) ABSTRACT

An exhaust-gas mixing pipe for admixing additive into an exhaust-gas stream of a combustion engine. The housing wall has multiple rows, arranged over a circumference U, of openings through which gas can flow into the interior of the pipe, wherein the at least one opening of a row forms in each case one stage M characterized according to its size by the average opening cross section Q of the openings, wherein the sum of all the opening cross sections Q of all the openings of all the rows of the exhaust-gas mixing pipe is equal to SQ. In that context, at least one first-order stage M1, is provided, wherein stage M1 has openings having an average opening cross section Q1. At least one second-order stage M2, is provided, with openings having an average opening cross section Q2, where $Q2 >= f \cdot Q1$, where $5 <= f <= 25$.

19 Claims, 5 Drawing Sheets

(51) Int. Cl.
    *B01F 3/04*     (2006.01)
    *B01F 5/04*     (2006.01)
    *B01F 5/00*     (2006.01)
    *B01D 53/94*     (2006.01)
    *B01D 46/00*     (2006.01)
    *F01N 3/20*     (2006.01)
    *F01N 3/021*     (2006.01)

(52) U.S. Cl.
    CPC ........ *B01F 3/04049* (2013.01); *B01F 5/0062* (2013.01); *B01F 5/0451* (2013.01); *F01N 3/021* (2013.01); *F01N 3/2066* (2013.01); *B01D 2279/30* (2013.01); *F01N 2610/1453* (2013.01)

(58) Field of Classification Search
    USPC .................................. 422/171, 176, 177
    See application file for complete search history.

(56) References Cited

U.S. PATENT DOCUMENTS

| | | | | |
|---|---|---|---|---|
| 5,426,269 A * | 6/1995 | Wagner | ............ | F01N 1/02 181/232 |
| 6,722,124 B2 * | 4/2004 | Pawson | ............ | B01D 53/9431 60/286 |
| 6,767,378 B2 * | 7/2004 | Nishiyama | ............ | F01N 3/0814 55/309 |
| 7,980,069 B2 * | 7/2011 | Arellano | ............ | F01N 3/025 60/274 |
| 8,033,104 B2 * | 10/2011 | Zhang | ............ | F01N 3/36 60/295 |
| 2003/0079467 A1 * | 5/2003 | Liu | ............ | B01F 3/04049 60/286 |
| 2006/0218902 A1 | 10/2006 | Arellano et al. | | |
| 2008/0307780 A1 | 12/2008 | Iverson et al. | | |
| 2010/0107612 A1 | 5/2010 | Yamazaki et al. | | |
| 2010/0263359 A1 * | 10/2010 | Haverkamp | ............ | F01N 3/2066 60/303 |
| 2011/0308234 A1 * | 12/2011 | De Rudder | ............ | B01F 3/04049 60/295 |
| 2012/0151902 A1 * | 6/2012 | Yi | ............ | F01N 3/2066 60/301 |
| 2014/0196441 A1 | 7/2014 | Katou et al. | | |
| 2014/0230411 A1 * | 8/2014 | De Rudder | ............ | F01N 3/2066 60/274 |
| 2015/0040537 A1 * | 2/2015 | Hicks | ............ | F01N 3/2066 60/273 |
| 2015/0044103 A1 * | 2/2015 | Sampath | ............ | F01N 3/206 422/168 |

FOREIGN PATENT DOCUMENTS

| | | |
|---|---|---|
| DE | 10 2012 010878 A1 | 12/2013 |
| EP | 2 687 697 A2 | 1/2014 |
| WO | 2009107376 A1 | 9/2009 |
| WO | 2015020820 A1 | 2/2015 |

\* cited by examiner

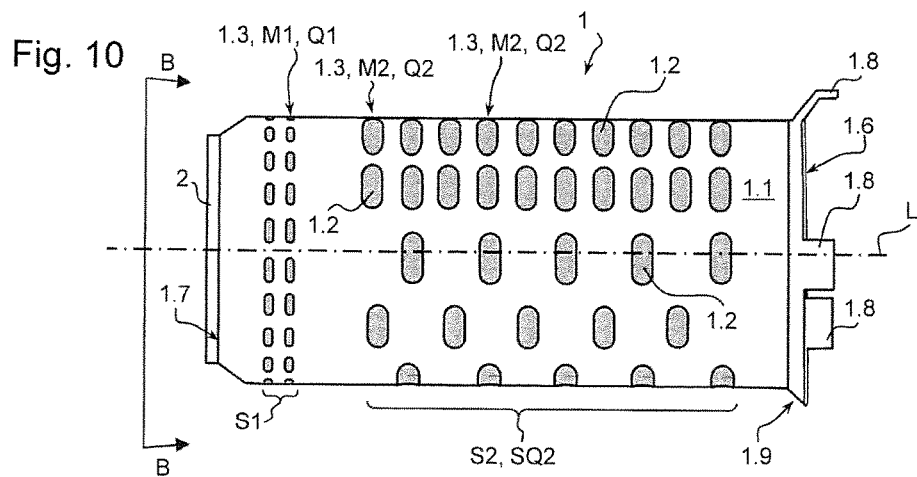
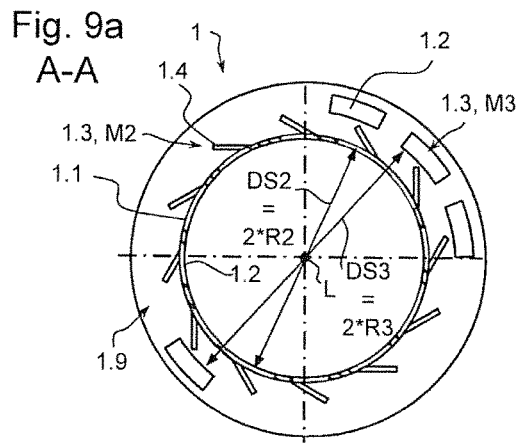
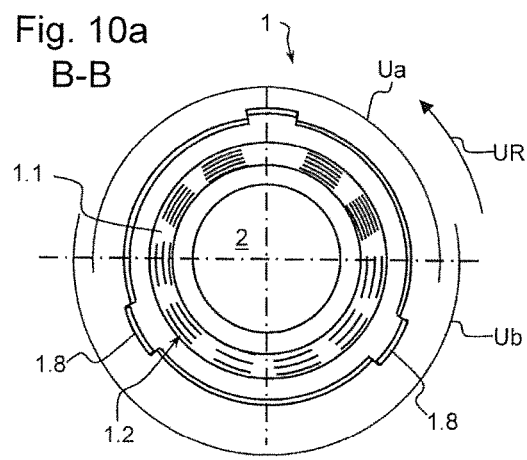
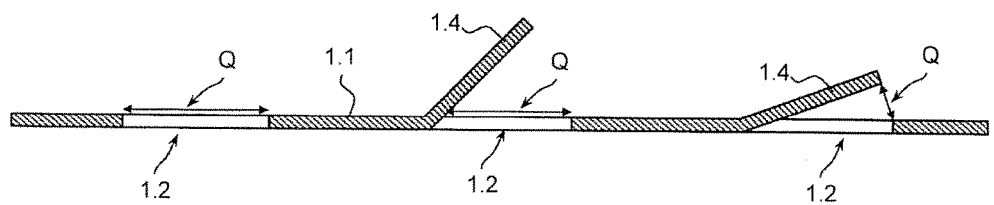

EXHAUST-GAS MIXER

FIELD OF THE INVENTION

The invention relates to an exhaust-gas mixing pipe for admixing at least one additive into an exhaust-gas stream of an internal combustion engine having a housing wall of longitudinal axis L and of round cross section, and an end wall arranged at the end side with respect to the longitudinal axis L, on which can be placed an injection nozzle, wherein the housing wall has multiple rows arranged over a circumference U, of openings through which exhaust gas can flow from an outer side of the exhaust-gas mixing pipe into the interior of the exhaust-gas mixing pipe, wherein the at least one opening of a row forms in each case one stage M and wherein the respective stage M is characterized according to its size by the average opening cross section Q of the openings, wherein the sum of all the opening cross sections Q of all the openings of all the rows of the exhaust-gas mixing pipe is equal to SQ.

The invention further relates to an exhaust-gas mixer consisting of an exhaust-gas mixing pipe and a mixer housing, wherein the mixer housing has an inlet opening and an outlet opening for exhaust gas and the exhaust-gas mixing pipe is positioned at the outlet opening with the end of the pipe opposite the end wall.

The invention further relates to an exhaust system for an internal combustion engine having an exhaust-gas mixer and an exhaust-gas aftertreatment device such as a DPF and/or a SCR arranged downstream in the direction of flow of the exhaust gas.

BACKGROUND OF THE INVENTION

A mixing pipe is already known from DE 20 2007 010 324 U1. The mixing pipe has a cylindrical basic form with a conical enlargement. Nine rows of openings are provided in total, which are each designed as a blade-free recess of the wall. A mixing stage designed in such a way is placed inside the conical enlargement.

A mixing pipe, which is arranged upstream of a funnel element having a perforated lateral surface, is also known from DE 10 2012 010 878 A1.

A two-part mixing pipe, wherein both parts are arranged at a distance from one another and have an at least partially perforated lateral surface, is known from US 2014/0196441 A1.

An exhaust-gas mixer having a mixing pipe is known from EP 2 687 697 A2. The mixing pipe has an exclusively cylindrical basic form. A total of eleven rows of openings are provided, wherein the respective opening is designed as a formation of the wall, and the formed part of the wall at least partially forms a blade. Both the distance of the rows from each other and the distance of the openings in the circumferential direction increase in the direction of flow.

SUMMARY OF THE INVENTION

The object of the invention is to design and arrange a mixing pipe and an exhaust-gas mixer in such a way that an improved admixture of additive into the exhaust-gas stream is guaranteed.

The object is achieved according to the invention in that at least one first-order stage, stage M1, is provided, wherein the stage M1 has openings 1.2 having an average opening cross section Q1 and that, in addition, at least one second-order stage, stage M2, is provided, wherein the stage M2 has openings having an average opening cross section Q2, where Q2≥f Q1, where 5≤f≤25, and there is provided a first sector S1 which is designed as a flushing sector and consists of at least the one stage M1, and a second sector S2 which is designed as a mixing sector and consists of at least the one stage M2, wherein, in the direction of the longitudinal axis L toward the end wall (2), the first sector S1 is positioned first and the second sector S2 is positioned thereafter. Thanks to the arrangement of two sectors S1, S2 having different opening cross sections a flushing effect of the sector S1 is achieved, by means of which backwashing effects in the region of the nozzle are prevented. This, in turn, supports the admixing of the additive in sector 2, the opening cross sections of which are larger.

To this end, it can also be advantageous if the respective stage M, i.e. M1, M2, M3 and/or M4, or the sector S, i.e. S1, S2, S3 and/or S4, has/have at least predominantly openings which are each designed as a recess of the wall, i.e. free of blades or free of formations, and/or that the respective stage M or the sector S has at least predominantly openings which are designed as a formation of the housing wall, wherein the formed part of the wall at least partially forms a blade. Both blades and holes are conducive for good admixing. This is also true of a combination of both configurations. Notwithstanding a mere hole in the housing wall, anything which has a residual part of the wall with a different radius to the housing wall itself is referred to as a blade. It is therefore not a matter of the size and number of the free-standing blade edges.

The blades can also be aligned in opposite directions. The blades can be of any shape. The blades are positioned at least in part outwardly, but can also be positioned at least in part inwardly into the interior of the pipe. The blades can have one, two or three sides. The size of the blades can also deviate from the size of the formation.

The cross-sectional form of the housing wall can be circular, oval or round in some other way. However, angular shapes are disadvantageous due to the routing of the flow in the circumferential direction. The housing wall can also have two parts or multiple parts.

The arrangement of the rows over the circumference U firstly only refers to the fact that the row has a directional component in the circumferential direction UR. The row can therefore also extend in a spiral form. One opening per row is sufficient to establish a stage. Since at least two stages are required, at least two openings are also provided, which each form a row or a stage. Multiple stages of the same order are referred to as a sector.

The end wall is generally arranged at the end side with respect to the longitudinal axis L. However, it can also be indented, so that the housing wall or the exhaust-gas mixing pipe projects over the end wall at the end side. The end wall is welded onto or pressed into the exhaust-gas mixing pipe and also serves to receive the nozzle directly or indirectly.

The exhaust-gas mixing pipe can be cylindrical or conical or designed in the form of a conical outline at least in the region of all of the sectors or at least in the region of individual sectors.

Irrespective of any blades or formations the smallest effective flow cross section of the opening is referred to as the opening cross section.

It can further be advantageous if the blade has a blade axis which extends parallel to the longitudinal axis L or which extends tangentially to the circumference U or which is arranged with the longitudinal axis L in a joint plane E. The blades can be set at a fixed angle or articulated longitudinally to the exhaust-gas mixing pipe or transversely to the exhaust-gas mixing pipe. This also applies to conical-shaped pipes.

It can also be advantageous if the sector S1 has a sum SQ1 of the opening cross sections Q1, where SQ1≤x1 SQ, where 0.05≤x1≤0.25. In addition to the smaller opening cross sections, the size of the opening is reduced overall so that the flushing effect is brought to bear in an even better manner.

It can be advantageously provided that the sector S1 consists of a maximum of three, four or five stages M1 and/or that the sector S2 consists of a maximum of two, three, four, five, six, seven, eight, nine or ten M2 stages. In addition, it can be advantageous if at least one of the two sectors S1, S2 has at least two stages M1, M2.

It can be particularly important for the present invention if at least one additional sector S3 is provided with at least one third-order stage M3, having an average opening cross-section Q3 and having a sum SQ3 of the opening cross sections Q3, where SQ3≤x2 SQ, where 0.05≤x2≤0.35. The variation of the opening cross sections as a whole results in a good admixing result.

In connection with the design and arrangement according to the invention, it can be advantageous if the openings of the stage M3 are an average distance r3 from the longitudinal axis L and the openings of the stage M2 are an average distance r2 from the longitudinal axis L, where r3≥1.05 r2. It is therefore possible to achieve a jacket flow through the sector S3 which is arranged around the basic flow, so that the basic flow is protected so to speak. This ensures that nothing is deposited on the wall during the further course of the flow. The distance r3, r2 from the longitudinal axis L corresponds to half the diameter DS2, DS3 and designates an average distance r2 and refers to a fictitious midpoint of the respective opening.

It can further be advantageous if at least one additional sector S4 is provided having at least one stage M1, M2 and/or M3, wherein the sector S4 is arranged between the sector S2 and the sector S3. Increased admixing is achieved due to the additional sector S4.

In addition, it can be advantageous if the exhaust-gas mixing pipe in the region of the sector S1 has an average diameter DS1 and the sector S1 is a maximum distance AS1 from the end wall, where AS1≤y1 DS1, where 0≤y1≤0.3 or 0≤y1≤0.2. Thanks to the arrangement of the sector S1 near the end wall, in which the nozzle is arranged, the flushing effect indicated above, therefore the prevention of backflows, is achieved and encouraged. The distance AS1 or AS2 refers to the part of the respective opening or step facing the end wall or the end of the end wall facing the opening.

It can further be advantageous if the opening cross section Q2 or Q3 has a value qa over a first partial circumference Ua of 100° to 180° which can be turned toward the stream and a value qb over an opposite partial circumference Ub of 100° to 180° with respect to the longitudinal axis L, where 1.1 qa≤qb. By varying the opening cross section over the circumference, account can be taken of the dynamic flow conditions around the exhaust-gas mixing pipe. The side toward which the exhaust gas flows at a higher dynamic pressure has a lower opening rate than the side facing away from the exhaust-gas stream, so that an inflow into the exhaust-gas mixing pipe which is as uniform as possible is achieved overall.

In this case it can be advantageous if the openings and/or the blades of the respective mixing stage M1, M2, M3 are arranged offset to one another with respect to the direction of the longitudinal axis L. Thanks to the offset arrangement a helical arrangement of the blades or openings is achieved, which can have a positive impact on the inflow conditions. The size of the blades and of the openings can also vary with respect to the direction of the longitudinal axis L as shown in the embodiment examples.

Finally it can be advantageous if the exhaust-gas mixing pipe is calibrated with respect to the diameter and/or cross-sectional form at least in the region of the start of a pipe and/or of the end of a pipe. The result of this calibration is that the exhaust-gas mixing pipe can be simply connected or coupled, both to an end wall or an injection nozzle body and to the other exhaust-gas housing or an outlet connection. The calibration guarantees that the indicated components are pressed in.

To this end, it can also be advantageous if the exhaust-gas mixing pipe has an average diameter DS1 in the region of the sector S1 and an average diameter DS2 in the region of the sector S2, wherein DS1=DS2 or the diameter DS1 deviates by a maximum of 5%-10% from the diameter DS2. Both sectors S1 and S2 are preferably arranged approximately on the same diameter. A deviation of 5%-10% can be expedient for this.

In addition, it can be advantageous if the inlet opening has an inflow cross section T, where 0.8 SQ≤T≤4SQ. The ratio between the inflow cross section T and the sum of all cross section openings SQ should preferably be in the region indicated above in order, on the one hand, to minimize the flow losses and, on the other hand, to guarantee sufficient admixing.

It can also be advantageous if there is provided [16] between the end of the pipe of the exhaust-gas mixing pipe and the outlet opening an annular gap having an opening cross section QR, where QR≤x3 SQ, where 0.05≤x3≤0.35. The annular gap can be used as an alternative to the sector S3, which has a larger diameter DS3 compared to the sector S2. A jacket flow is also made available by means of the annular gap, which protects the core flow in the exhaust-gas mixing pipe.

Finally it can be advantageous if the exhaust-gas mixing pipe has a conical widened portion at the start of the pipe and/or at the end of the pipe. The aforementioned jacket effect is supported by the conical widened portion.

And finally it can be advantageous if a nozzle having a discharge opening is provided for introducing the additive, wherein the exhaust-gas mixing pipe has an average diameter DS1 in the region of the sector S1 and the discharge opening is a maximum distance ADA from the end wall, where ADA≤y2 DS1, where 0.4≤y2≤0.8 or y2=0.5. Corresponding to the distance of the sector S1, the arrangement of the nozzle or the furthest forward discharge opening thereof in the vicinity of the end wall is advantageous. The discharge opening can thereby be arranged inside the exhaust-gas mixing pipe or located upstream of the exhaust-gas mixing pipe, therefore before the end wall with respect to the direction of flow.

It can be advantageous if the exhaust-gas mixing pipe has an average diameter DS1 in the region of the sector S1 and an average diameter DS2 in the region of the sector S2, and the respective sectors are arranged with respect to one another in the direction of the longitudinal axis L at a distance AS2, where DS2≤5AS2 or DS1≤5AS2 and 2 AS2≤DS1 or 2 AS2≤DS2.

It can be advantageous if the openings and/or the blades of the respective stage M1, M2 are designed with different sizes with respect to a circumferential direction UR.

It can additionally be advantageous if the exhaust-gas mixing pipe at the end of the pipe is fixed to the mixer housing in the region of the outlet opening by means of a maximum of three or four retaining crosspieces.

BRIEF DESCRIPTION OF THE DRAWINGS

Further advantages and details of the invention are explained in the claims and in the description and illustrated in the figures, wherein:

FIGS. 1, 2, 3, 4, 5, 6, 7, 8, 9, 9a, 10 and 10a show very different embodiments of the exhaust-gas mixing pipe 1;

FIG. 11 shows a schematic diagram regarding the opening cross section;

DETAILED DESCRIPTION OF THE INVENTION

Figure 1:
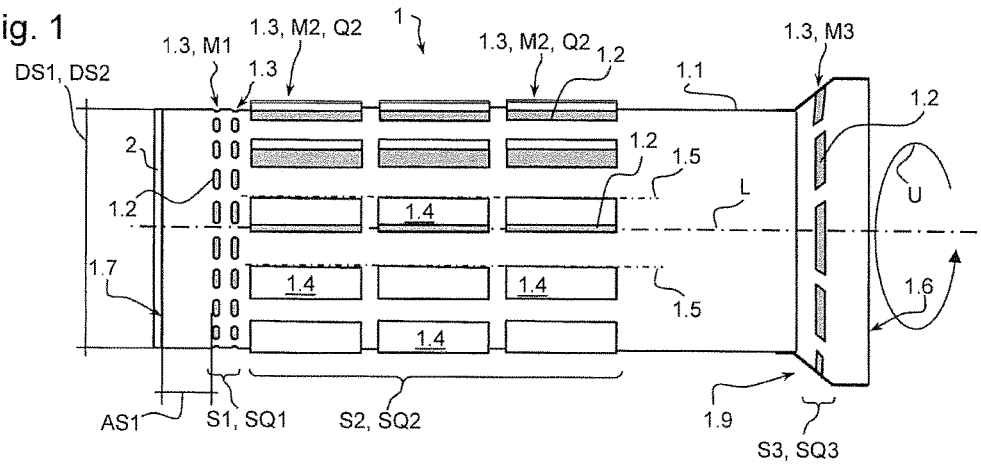

Common to all embodiments of an exhaust gas mixing pipe 1 is a housing wall 1.1 having multiple rows 1.3 of openings 1.2, an end wall 2 at the start of the pipe 1.7 and an open end at the end of the pipe 1.6. In addition, a first sector S1 having two rows 1.3 of openings 1.2 having an average opening cross section Q1, therefore two first-order stages M1. The openings 1.2 are each designed as a blade-free recess of the housing wall 1.1. The sum of all the opening cross sections Q1 of a sector S1 is SQ1. The sum of all the opening cross sections Q of all the openings 1.2 of all the rows 1.3 of the exhaust-gas mixing pipe 1 is SQ. SQ1≤0.15 SQ initially applies to the ratio of SQ1 to SQ.

Figure 9:
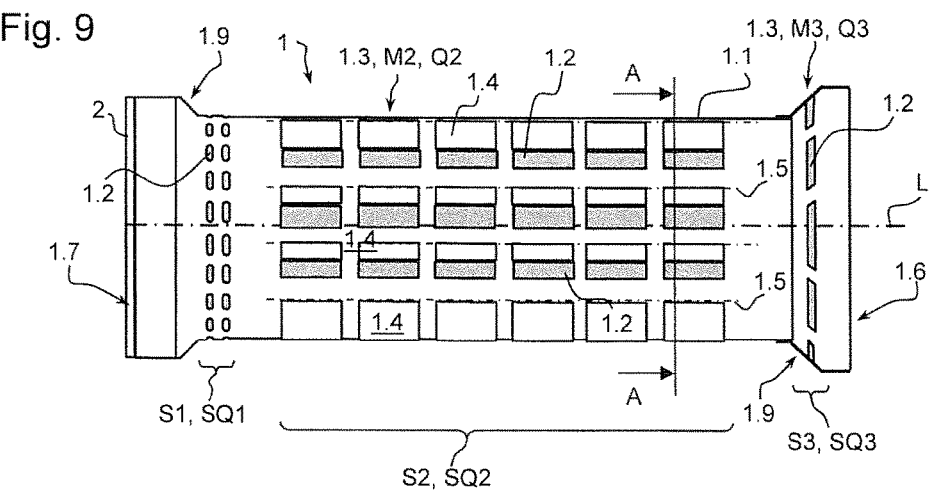

The housing wall 1.1 has a diameter DS1 which corresponds to double the distance from a longitudinal axis L (see FIGS. 9, 9a). The sector S1 has a distance AS1 from the end wall 2, where AS1≤0.2 DS1.

Figure 2:
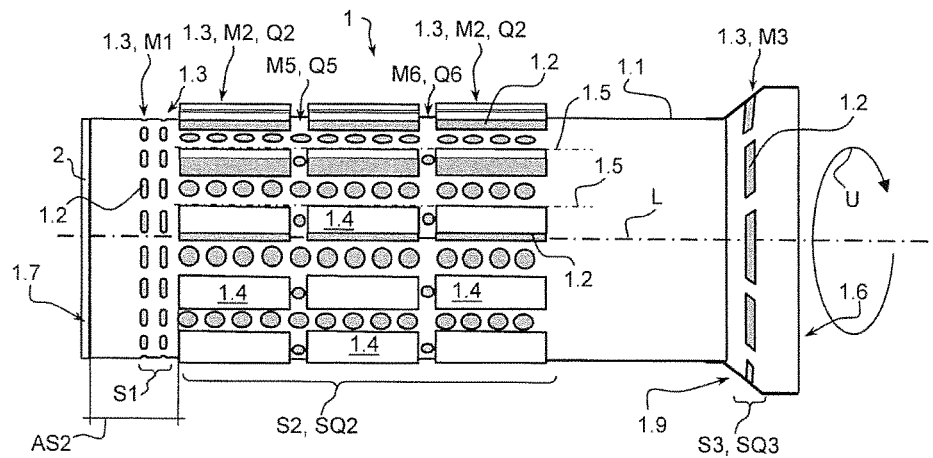
Figure 3:
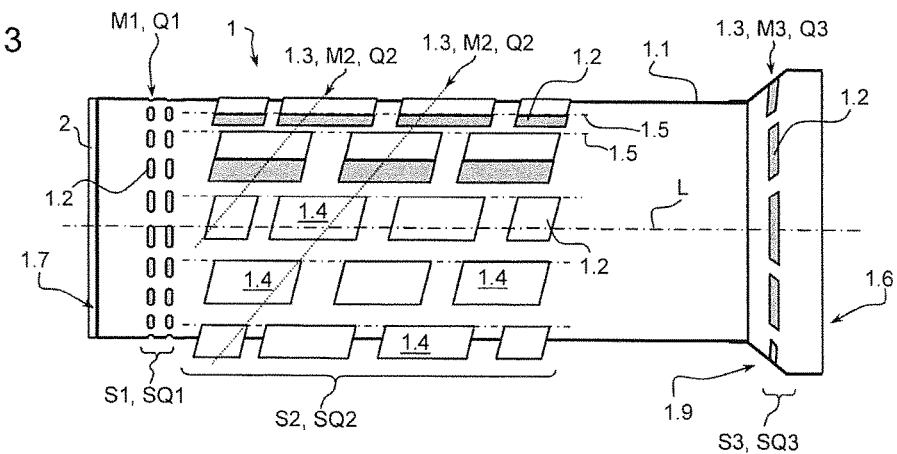

A second sector S2 having multiple stages M2 formed from multiple rows 1.3 of openings 1.2 having an average opening cross section Q2 is provided for all embodiments of the exhaust-gas mixing pipe 1. The sum of all the opening cross sections Q2 of the sector S2 is SQ2. Whilst the embodiments in FIGS. 1, 3-6, 8 and 9 are openings 1.2 which are designed as a formation of the housing wall 1.1, wherein the formed part of the housing wall 1.1 forms a blade 1.4, the respective opening 1.2 is designed as a recess of the housing wall 1.1 which is blade-free in the embodiments in FIGS. 10 and 11. The embodiments in FIGS. 2 and 7 are a mixed variant of openings 1.2. The respective row 1.3 is formed from formations having a blade 1.4, on the one hand, and recesses arranged therebetween, on the other hand. In this case, the average opening cross section Q2 in sector S2 is the quotient formed from the sum of the opening cross sections Q of a row 1.3 divided by the number of openings 1.2 of this row 1.3.

A stage M3 having a row 1.3 of openings 1.2 having an average cross section Q3 is considered as the third sector S3 for the embodiments in FIGS. 1 to 7 and FIG. 9, with the latter being combined with a conical widened portion 1.9 of the exhaust-gas mixing pipe 1 at the end of the pipe 1.6 to achieve a larger diameter DS3 in accordance with the cross-sectional view in FIG. 9a. The diameter DS3 and the ratio thereof to a diameter DS2 regarding the respective opening 1.2 of the sector S2 is shown in FIG. 9a, a cross-sectional view A-A from FIG. 9. SQ3≤=0.2 SQ applies initially to the ratio of SQ3 to SQ.

Figure 8:
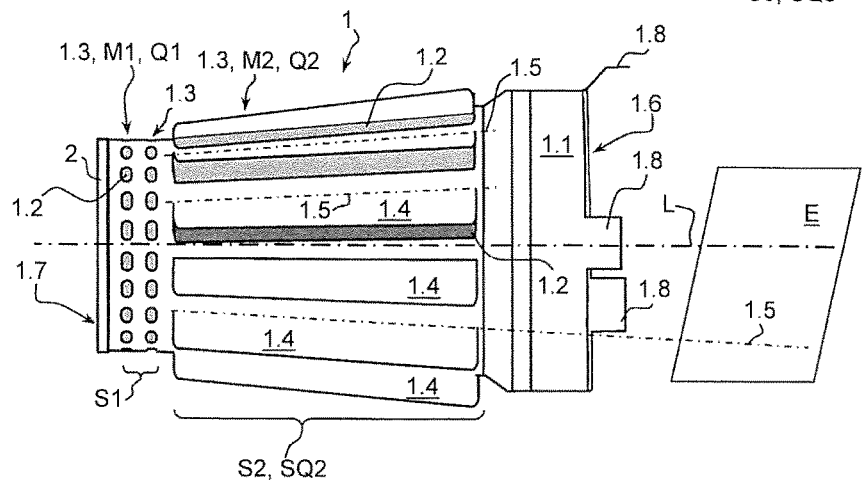
Figure 12:
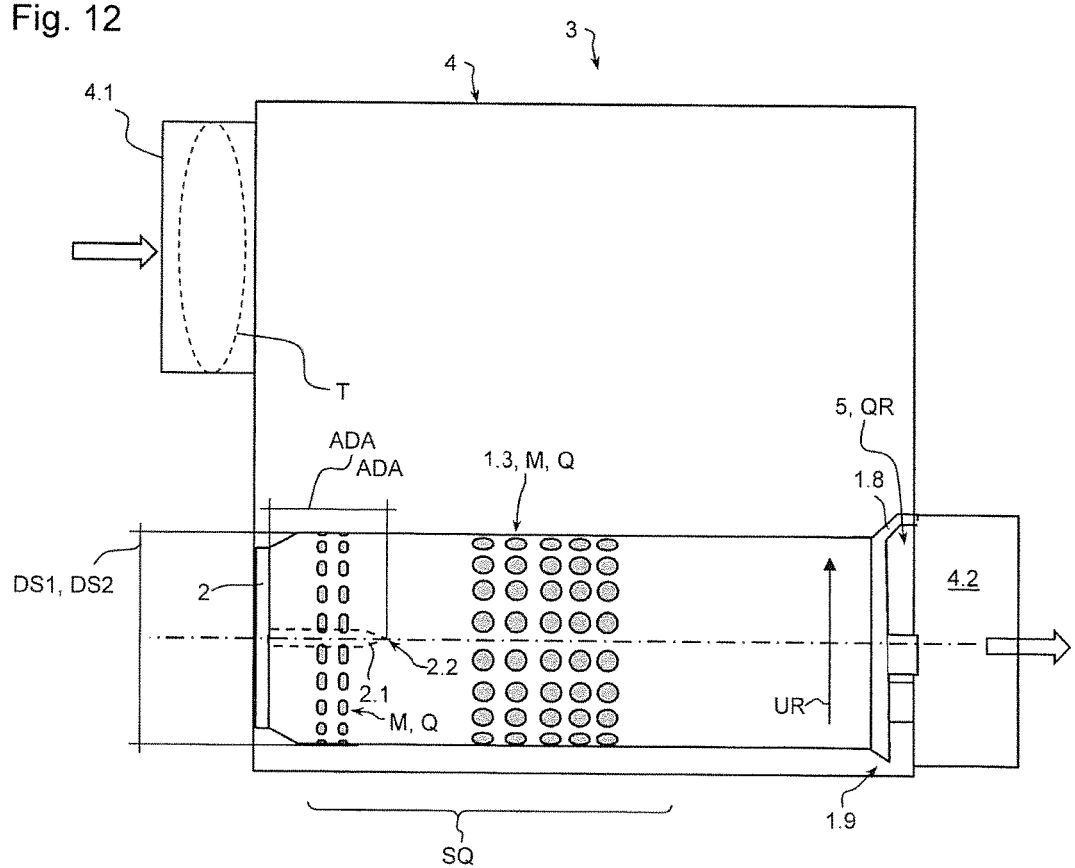
FIG. 12 shows a schematic diagram of an exhaust-gas mixer.

As an alternative to the openings 1.2, the embodiments in accordance with FIGS. 8, 10 and 12 have an annular gap 5 at the end side. The latter is limited according to FIG. 12 by means of an outlet opening 4.2 or an outlet connection of a mixer housing 4. There are provided in the circumferential direction three retaining crosspieces 1.8 which join the end of the pipe 1.6 and which are connected to an outlet opening 4.2 of a mixer housing 4 according to FIG. 12. A conical widened portion 1.9 to which the retaining crosspieces 1.8 are joined is provided at the end of the pipe 1.6 according to FIG. 10.

According to the embodiment in FIG. 2 two stages M5, M6 which each have a different opening cross section Q5, Q6 are provided within the sector S2. These are openings 1.2 which are each designed as a blade-free recess of the housing wall 1.1. The two stages M5, M6 should not be considered during the determination of the opening cross section SQ2, so that a separate value is to be determined for the sum of the opening cross sections for the sector S2 having the two stages M5, M6.

Figure 4:
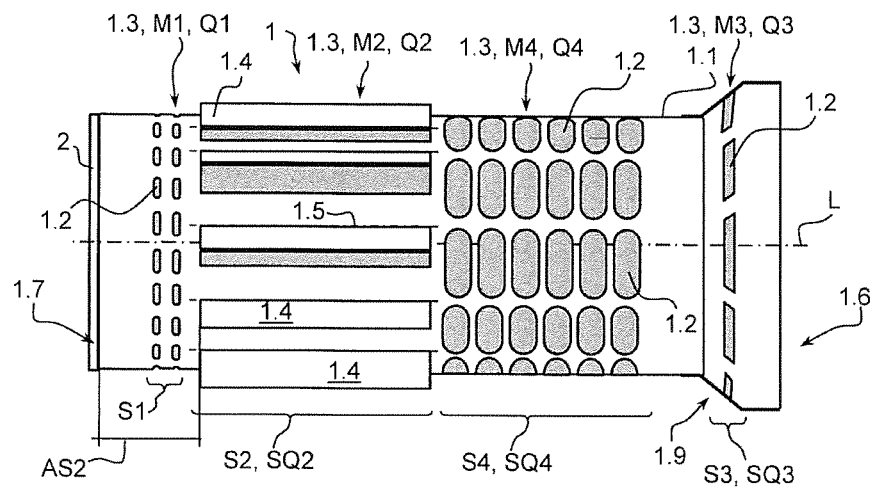
Figure 5:
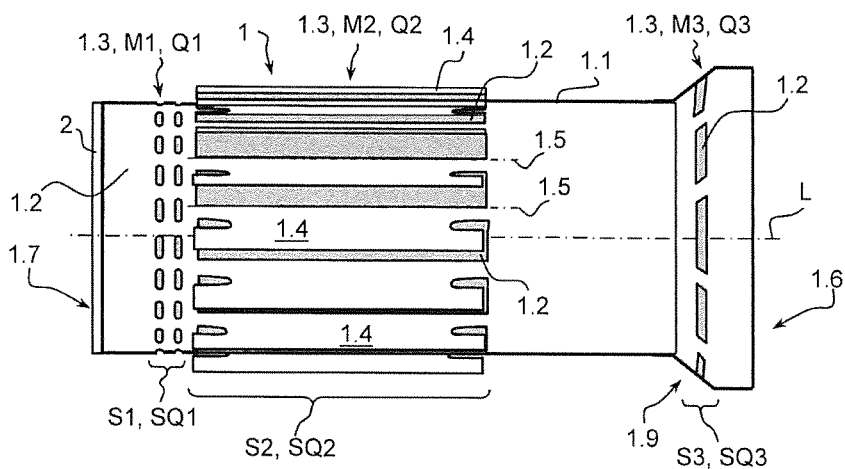
Figure 6:
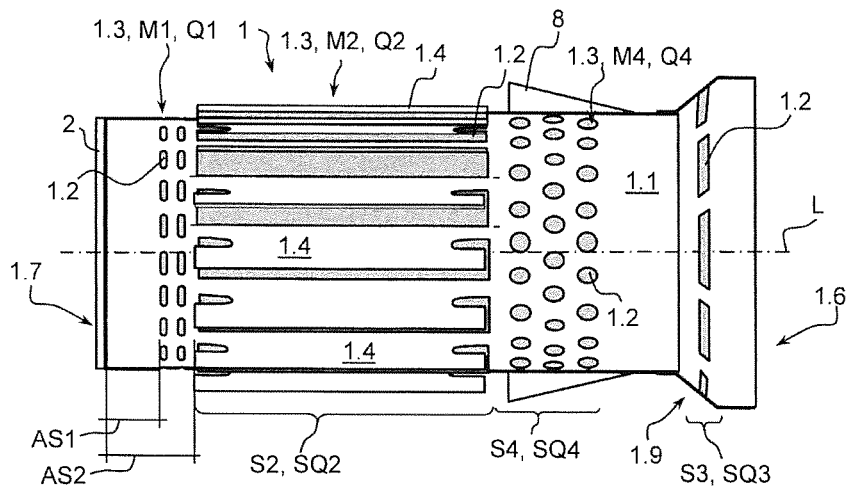
Figure 7:
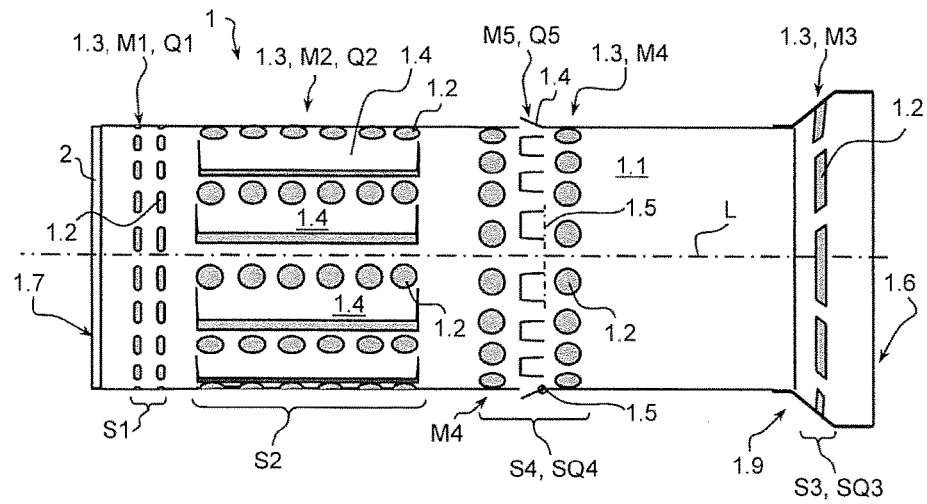

According to the embodiments in FIGS. 4, 6 and 7 there is provided a sector S4 which is arranged in each case with a clear distance between the sectors S2 and S3. The sector S4 has six stages M4 according to FIG. 4, three stages M4 according to FIG. 6 and two stages M4 according to FIG. 7, with each having an opening cross section Q4. In the case of the two embodiments in FIGS. 4 and 6 the stages M4 are arranged directly beside one another. According to FIG. 7, the stage M5 is provided between the two stages M4. Whilst the sector S4 has openings 1.2 which are each designed as a blade-free recess of the housing wall 1.1, the stage M5 has openings which are designed as a formation of the housing wall 1.1, wherein the formed part of the housing wall 1.1 forms the blade 1.4. A separate value for the sum of the opening cross sections is to be determined for the sector S4 with the stage M5.

According to the embodiment in FIG. 6 there is provided in the region of the sector S4 a circumferential inlet funnel 8, by means of which the exhaust-gas stream is supplied to the sector S4.

According to FIG. 7 a blade axis 1.5 of the blades 1.4 extends substantially in a tangential direction to the longitudinal axis L. According to FIG. 8 the housing wall 1.1 is designed in a conical form in the region of the sector S2, therefore the blade axis 1.5 of the blades 1.4 does not extend parallel to the longitudinal axis L. However, the respective blade axis 1.5 and the longitudinal axis L are arranged in a joint plane E.

According to FIGS. 10, 10a the opening cross section Q2 over a first partial circumference Ua of approximately 180° which can be turned toward the exhaust-gas stream is half as large as an opening cross section Q2 of an opposite partial circumference Ub of approximately 180° with respect to the longitudinal axis L. The dynamic pressure gradient of the inflow is therefore taken account of. FIG. 10a shows a slightly centric view B-B from FIG. 10. The variation of the opening cross section Q or of the opening density in the lower partial circumference Ub, as can be seen in the side view in FIG. 10, is shown in perspective in FIG. 10a and according to the principle by the hatch pattern density on the housing wall 1.1.

FIG. 11 shows by way of example the opening cross section Q which, according to the definition, is the smallest passage opening. Whereas in the case of a recess 1.2, i.e. a simple hole (left variant), the definition of the opening cross section Q is obvious, the situation can be different when a blade 1.4 is used, depending on the angle of attack. In the case of blades 1.4 set at a steep angle (middle variant) the opening cross section Q of the recess 1.2 is probably also considered, since the circumferential blade gap on three sides will be larger than the blade surface. In the case of a blade 1.4 which is set at a flat angle (right variant), however, the circumferential blade gap on the other side or on three sides is considered as the smallest opening cross section Q, since the formation itself, in this case the blade surface, will be larger.

In the case of an exhaust-gas mixer 3 according to FIG. 12, the mixer housing 4 is provided with an inlet opening 4.1 or an inlet connection and an outlet opening 4.2 or an outlet connection. The inlet opening 4.1 has an inflow cross section T, where $1.3 \ SQ \leq T \leq 1.5 \ SQ$. Joined to the outlet connection 4.2 is the exhaust-gas mixing pipe 1, with these being joined by means of the indicated retaining webs 1.8 at the end of the pipe 1.6 which provide the annular gap 5 indicated. Due to the conical widened portion 1.9 of the exhaust-gas mixing pipe 1 or the enlarged diameter of the outlet opening 4.2, a jacket flow of the exiting exhaust gas can be guaranteed in the outlet connection 4.2. The jacket flow surrounds the flow exiting through the exhaust-gas mixing pipe 1, thus preventing additives from being deposited at the outlet connection 4.2 or on a pipe wall. The annular gap 5 has an opening cross section QR, wherein the following formula initially applies: $QR \leq 0.2 \ SQ$.

In the region of the end wall 2 there is provided an injection nozzle 2.1 with a discharge opening 2.2. The discharge opening 2.2 is a shown distance ADA from the end wall 2, where $ADA \leq 0.5 \ DS1$.

Figure 13:
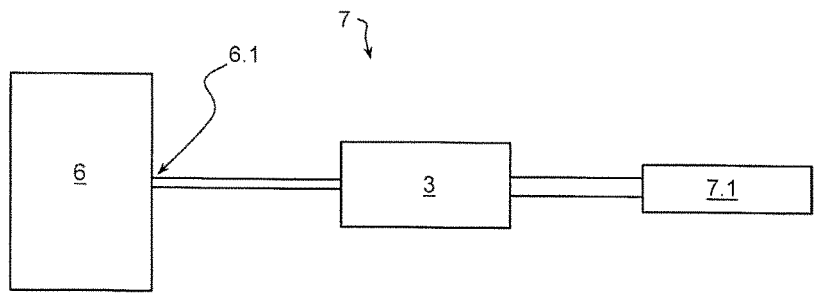
FIG. 13 shows a schematic diagram of an exhaust system.

FIG. 13 shows in principle an internal combustion engine 6 having an exhaust system 7, in which an exhaust gas mixer 3 is arranged, which is followed by an exhaust gas after treatment device 7.1.

All of the aforementioned variants for the design of the sectors S1, S2, S3, S4, or additional sectors S5 and S6 having multiple mixing stages M5, M6, as well as the number and the order of the mixing stages M1, M2, M3, M4, M5, M6 themselves are exemplary, and can also be considered in other combinations of the described variations.

LIST OF REFERENCE NUMERALS

1 Exhaust-gas mixing pipe
1.1 Housing wall
1.2 Opening, recess
1.3 Row
1.4 Blade
1.5 Blade axis
1.6 End of pipe
1.7 Start of pipe
1.8 Retaining crosspiece
1.9 Widened portion
2 End wall
2.1 Injection nozzle, nozzle
2.2 Discharge opening
3 Exhaust-gas mixer
4 Mixer housing
4.1 Inlet opening
4.2 Outlet opening
5 Annular gap
6 Internal combustion engine
6.1 Discharge opening
7 Exhaust system
7.1 Exhaust-gas aftertreatment device
8 Inlet funnel
ADA Distance of 6.1
AS1 Distance S1, S2
AS2 Distance between S1 and S2
DS1 Diameter for S1
DS2 Diameter for S2
DS3 Diameter for S3
E Plane
f Factor
12
L Longitudinal axis
l Factor
k Factor
M Stage
M1 Stage
M2 Stage
M3 Stage
M4 Stage
M5 Stage
M6 Stage
Q Opening cross section
Q1 Opening cross section of M1
Q2 Opening cross section of M2
Q3 Opening cross section of M3
Q4 Opening cross section of M4
Q5 Opening cross section of M5
Q6 Opening cross section of M6
QR Opening cross section of 5
qa Value
qb Value
r2 Distance, radius
r3 Distance, radius
S1 Sector
S2 Sector
S3 Sector
S4 Sector
S5 Sector
S6 Sector
SQ Sum Q
SQ1 Sum Q1 of S1
SQ2 Sum Q1 of S2
SQ3 Sum Q3 of S3
SQ4 Sum Q4 of S4
T Inflow cross section of 4.1
U Circumference
Ua Partial circumference
Ub Partial circumference
UR Circumferential direction
x1 Factor
x2 Factor
x3 Factor
y1 Factor
y2 Factor

What is claimed is:

1. An exhaust-gas mixing pipe for admixing at least one additive into an exhaust-gas stream of an internal combustion engine, comprising: a housing wall of longitudinal axis L and of round cross section, and a closed end wall on which can be placed an injection nozzle, for said additive wherein the housing wall has multiple rows arranged over a circumference U, of openings, through which exhaust gas can flow from an outer side of the exhaust-gas mixing pipe into an interior of the exhaust-gas mixing pipe, wherein several openings of a row form in each case one stage M and wherein the respective stage M is characterized according to its size by an average opening cross section Q of its openings, wherein a sum of all the opening cross sections Q of all the openings of all the rows of the exhaust-gas mixing pipe is equal to SQ, wherein at least one first-order stage, stage M1, is provided, wherein the stage M1 has openings having an average opening cross section Q1, and an, in addition, at least one second-order stage, stage M2, is provided, wherein a stage M2 has openings having an average opening cross section Q2, where Q2≥f Q1, where 5≤f≤25, and there is provided a first sector S1 which is designed as a flushing sector and consists of at least the one stage M1, and a second sector S2 which is designed as a mixing sector and consists of at least the one stage M2, wherein, in the direction of the longitudinal axis L toward the end wall, the first sector S1 is positioned first and the second sector S2 is positioned thereafter.

2. The exhaust-gas mixing pipe according to claim 1, wherein the stage M or a sector S has at least predominantly openings which are each designed as a recess of the housing wall, and/or the stage M or the sector S has at least predominantly openings which are designed as a formation of the housing wall, wherein the formed part of the housing wall at least partially forms a blade.

3. The exhaust-gas mixing pipe according to claim 2, wherein the blade has a straight blade axis which extends parallel to the longitudinal axis L or which extends tangentially to the circumference U or which is arranged in a joint plane E with the longitudinal axis L.

4. The exhaust-gas mixing pipe according to claim 2, wherein at least one additional sector S3 is provided with at least one third-order stage, stage M3, having an average opening cross section Q3 and having a sum SQ3 of the opening cross sections Q3, where SQ3≤x2 SQ, where 0.05≤x2≤0.35.

5. The exhaust-gas mixing pipe according to claim 4, wherein the openings of the stage M3 are an average distance r3 from the longitudinal axis L and the openings of the stage M2 are an average distance r2 from the longitudinal axis L, where r3≤1.05 r2.

6. The exhaust-gas mixing pipe according to claim 5, wherein the openings and/or the blades of the respective stage M1, M2, M3 are arranged offset to one another with respect to the direction of the longitudinal axis L.

7. The exhaust-gas mixing pipe according to claim 4, wherein at least one additional sector S4 is provided with at least one stage M1, M2 and/or M3, wherein the sector S4 is arranged between the sector S2 and the sector S3.

8. The exhaust-gas mixing pipe according to claim 4, wherein the opening cross section Q2 or Q3 has a value qa over a first partial circumference Ua of 100° to 180° which can be turned toward the stream and has a value qb over an opposite partial circumference Ub of 100° to 180° with respect to the longitudinal axis L, where 1.1 qa≤=qb.

9. The exhaust-gas mixing pipe according to claim 1, wherein the sector S1 has a sum SQ1 of the opening cross sections Q1, where SQ1<=x1 SQ, where 0.05<=x1<=0.25.

10. The exhaust-gas mixing pipe according to claim 1, wherein the sector S1 consists of a maximum of three to five stages M1 and/or the sector S2 consists of a maximum of 2 to 10 stages M2.

11. The exhaust-gas mixing pipe according to claim 1, wherein the exhaust-gas mixing pipe has an average diameter DS1 in the region of the sector S1 and the sector S1 is a maximum distance AS1 from the end wall, where AS1≤y1 DS1, and where 0≤y1≤0.3.

12. The exhaust-gas mixing pipe according to claim 1, wherein the exhaust-gas mixing pipe is calibrated at least in a region of a start of a pipe and/or of the end of a pipe with respect to the diameter and/or cross-sectional form.

13. The exhaust-gas mixing pipe according to claim 1, wherein the exhaust-gas mixing pipe has an average diameter DS1 in the region of the sector S1 and an average diameter DS2 in a region of the sector S2, wherein DS1=DS2 or the diameter DS1 deviates by a maximum of 5%-10% from the diameter DS2.

14. An exhaust-gas mixer consisting of an exhaust-gas mixing pipe according to claim 1 and a mixer housing, wherein the mixer housing has an inlet opening and an outlet opening for exhaust gas and the exhaust-gas mixing pipe is positioned with an end of a pipe opposite the end wall at an outlet opening.

15. The exhaust-gas mixer according to claim 14, wherein the inlet opening has an inflow cross section T, where 0.8 SQ≤T≤4SQ.

16. The exhaust-gas mixer according to claim 14 between the end of the pipe of the exhaust-gas mixing pipe and the outlet opening there is provided an annular gap having an opening cross section QR, where QR≤x3 SQ, and where 0.05≤x3≤0.35.

17. The exhaust-gas mixer according to claim 14, wherein the exhaust-gas mixing pipe has a conical widened portion at the start of the pipe and/or at the end of the pipe.

18. The exhaust-gas mixer according to claim 14, wherein a nozzle is provided with a discharge opening for introducing the additive, wherein the exhaust-gas mixing pipe has the average diameter DS1 in a region of the sector S1 and the discharge opening is a maximum distance ADA from the end wall, where ADA≤y2 DS1, and where 0.4≤y2≤0.8.

19. An exhaust system for an internal combustion engine having an exhaust-gas mixer according to claim 14 and an exhaust-gas aftertreatment device such as a DPF and/or a SCR arranged downstream in the direction of flow of the exhaust gas.

* * * * *